Figure 1:
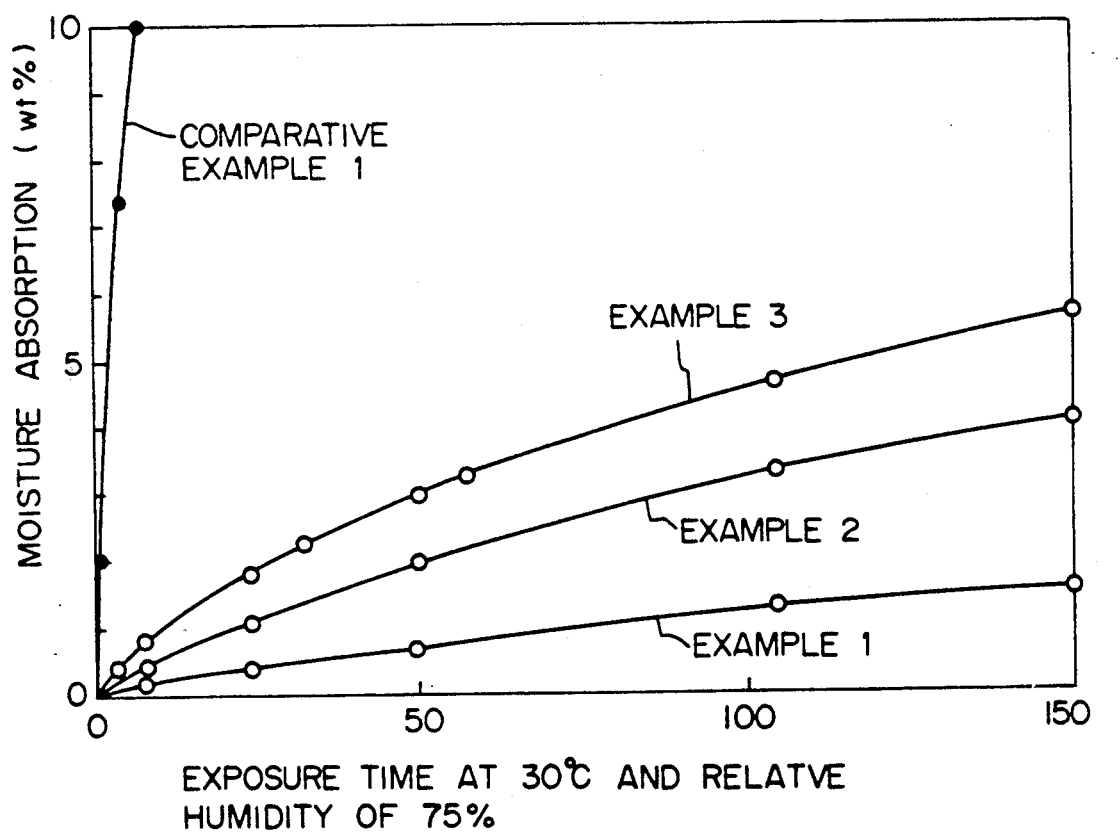

United States Patent [19]

Nosu et al.

[11] Patent Number: 5,106,898
[45] Date of Patent: Apr. 21, 1992

[54] STABILIZER COMPOSITION FOR USE IN HALOGEN-CONTAINING RESINS

[75] Inventors: Tsutomu Nosu; Shigeo Miyata, both of Takamatsu, Japan

[73] Assignee: Kyowa Chemical Industry Co., Ltd., Kagawa, Japan

[21] Appl. No.: 547,153

[22] Filed: Jul. 3, 1990

[30] Foreign Application Priority Data

Jul. 4, 1989 [JP] Japan .................................. 1-171167

[51] Int. Cl.⁵ ................................................ C08K 5/10
[52] U.S. Cl. .............................. 524/313; 252/400.52; 524/357; 524/436; 524/437
[58] Field of Search ............... 524/437, 436, 313, 357, 524/181; 252/400.52; 260/405.5, 409

[56] References Cited

U.S. PATENT DOCUMENTS

| | | | |
|---|---|---|---|
| 3,198,816 | 8/1965 | Zajcew | 260/409 |
| 3,317,436 | 5/1967 | Szczepanek et al. | 252/400 |
| 4,220,570 | 9/1980 | Loffelholz et al. | 252/400.52 |
| 4,379,882 | 4/1983 | Miyata | 524/437 |
| 4,427,816 | 1/1984 | Aoki et al. | 524/357 |
| 4,675,356 | 6/1987 | Miyata | 524/437 |

FOREIGN PATENT DOCUMENTS 63-314259  12/1988  Japan .

Primary Examiner—Veronica P. Hoke
Attorney, Agent, or Firm—Wenderoth, Lind & Ponack

[57] ABSTRACT

A stabilizer composition for use in halogen-containing resins, comprising as an active ingredient a melt mixture containing a product of a hydrotalcite obtained by removing water of crystallization and a lubricant.

8 Claims, 1 Drawing Sheet

STABILIZER COMPOSITION FOR USE IN HALOGEN-CONTAINING RESINS

This invention relates to a stabilizer composition for use in halogen-containing resins that prevents corrosion and formation of rust in metal portions of a molding machine and a mold at the time of molding as well as degradation of molded articles owing to heat or ultraviolet rays. The stabilizer composition for use in halogen-containing resins according to this invention is especially excellent in preventing occurrence of bubbles in molded articles.

The halogen-containing resins have defects that they tend to cause, due to a halogen contained therein, corrosion and formation of rust in metal portions of a molding machine and a mold at the time of molding or degradation of molded articles owing to heat or ultraviolet rays. It has been so far indispensable to blend the halogen-containing resins with a stabilizer for preventing such defects.

To this end, a great many proposals have been hitherto made. Among them, Japanese Patent Publication No. 46146/1983 (Japanese Patent Application No. 153733/1978) and Japanese Laid-open Patent Application No. 174270/1986 (Japanese Patent Application No. 13504/1985) which have been made by the present Applicant describe that when a hydrotalcite having a BET specific surface area of preferably 30 m²/g or less is blended in an amount of about 0.1% by weight per 100 parts by weight of a halogen-containing resin, the above defects in molding the halogencontaining resin and the degradation of the molded articles owing to heat or ultraviolet rays are quite effectively preventable.

The hydrotalcite however contains about 12 to 15% by weight of water of crystallization; there has been therefore a defect that if the halogen-containing resin is blended with the hydrotalcite as such, water of crystallization is isolated to cause occurrence of bubbles in the molded article. For this reason, the halogen-containing resin has been blended with the product of the hydrotalcite obtained by substantially removing water of crystallization upon previously heating the hydrotalcite at about 200° C.

Since the product of the hydrotalcite obtained by removing water of crystallization is however very high in moisture absorption, it is difficult to completely prevent absorption of moisture from the ambient atmosphere during storage until blending the halogen-containing resin with said product or molding the halogen-containing resin composition. It has therefore been quite difficult industrially to completely remove the defect of occurrence of bubbles from the molded article of the halogen-containing resin containing the product of the hydrotalcite obtained by removing water of crystallization.

FIG. 1 is a moisture absorption curve of a stabilizer at 30° C. and RH of 75%.

It is an object of this invention to provide a stabilizer for use in halogen-containing resins free from the aforesaid defects of the conventional hydrotalcite stabilizers. This invention provides a stabilizer composition for use in halogen-containing resins characterized by comprising a melt mixture containing a product of a hydrotalcite obtained by removing water of crystallization and a lubricant.

An example of the hydrotalcite used in this invention is a hydrotalcite represented by formula (1), $$Mg_{1-x}Al_x(OH)_2A^{n-}{}_{x/n} \cdot H_2O \tag{1}$$

wherein
$0 < x \leq 0.5$, preferably $0.2 \leq x \leq 0.4$,
$A^{n-}$ denotes an anion of n-valence, preferably $CO^{2-}_3$ or $SO^{2-}_4$, and
m is a positive number.

Another example of the hydrotalcite used in this invention is a hydrotalcite solid solution represented by formula (2), $$[Mg_{y1}Zn_{y2}]_{1-x}Al_x(OH)_2A^{n-}{}_{x/n} \cdot mH_2O \tag{2}$$

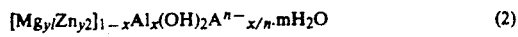

wherein
$A^{n-}$ denotes an anion of n-valence, preferably $CO^{2-}_3$ or $ClO^-_4$, and
x, y1, y2 and m are positive numbers of formulas:
$0 < x \leq 0.5$,
$0.5 < y1 < 1$,
$0 < y2 < 0.5$, and
$0 \leq m < 2$.

The hydrotalcites represented by formulas (1) and (2) are crystalline compounds having the same crystal structures as the hydrotalcites.

The product of the hydrotalcite obtained by removing water of crystallization in this invention can be obtained by heating a powdery hydrotalcite hard of agglomeration in air or in an atmosphere of $N_2$, He, $O_2$ or $CO_2$ or in vaccuo at a temperature of about 150° to 300° C. for about several tens of minutes to several days. The products of the hydrotalcites obtained by removing water of crystallization which are preferably used in this invention are those of formulas (1) and (2) wherein m is 0.5 or less, preferably 0.3 or less.

In this invention, in order to further improve compatibility with the resin and dispersibility and ameliorate effects of this invention, the hydrotalcites of formulas (1) and (2) can be surface-treated with a surface treating agent.

Examples of such surface treating agent include higher aliphatic acids such as stearic acid, oleic acid and lauric acid; anionic surface active agents such as sodium stearate, sodium oleate and sodium laurylbenzenesulfonate; silane coupling agents such as vinyltriethoxysilane and gamma-methacryloxypropyltriethoxysilane; titanate coupling agents such as isopropyltriisostearoyl titanate and isopropyldecylbenzenesulfonyl titanate; and esters of glycerol and aliphatic acids such as glycerol monostearate and glycerol monooleate.

Examples of the lubricant used in this invention can be saturated aliphatic acids with 10 to 30 carbon atoms that may optionally be mono- to tri-substituted by a hydroxyl group, their esters, their amines, their metal salts, low-molecular-weight polyolefin polymers and mixtures thereof. Of these, esters of saturated aliphatic acids with 10 to 30 carbon atoms, preferably 15 to 20 carbon atoms that may optionally be mono- to trisubstituted by a hydroxyl group and polyols are preferable, and triglycerides with glycerol are more preferable. The low-molecular-weight polyolefin polymers are also preferable, and a polyethylene wax is more preferable.

Regarding the acid component of the esters of the saturated aliphatic acids with 10 to 30 carbon atoms that may optionally be mono- to tri-substituted by the hydroxyl group, examples of the saturated aliphatic acids with 10 to 30 carbon atoms include undecanoic acid, lauric acid, myristic acid, palmitic acid, stearic acid, behenic acid and montanic acid. Examples of the saturated aliphatic acids with 10 to 30 carbon atoms that may optionally be mono- to tri-substituted by the hydroxyl group include 12-hydroxylauric acid, 3,11-dihydroxymyristic acid, 16-hydroxypalmitic acid, 12-hydroxystearic acid and 9,10-dihydroxystearic acid.

As the lubricant, a hydrogenated castor oil is especially preferable.

The melt mixture containing the product of the hydrotalcite obtained by removing water of crystallization and the lubricant (hereinafter simply referred to as a "melt mixture"), which mixture is an active ingredient of the stabilizer composition in this invention, can readily be obtained by, for example, heating the lubricant in a mixer at a temperature above its melting point, e.g. 100° to 200° C. to melt it, then adding said product of the hydrotalcite under stirring and mixing them uniformly enough.

Examples of the mixer suited for melt-mixing are a Henschel mixer, a disper mixer and a homomixer.

The content of the product of the hydrotalcite obtained by removing water of crystallization in the melt mixture used in this invention is about 1 to about 90% by weight, preferably about 10 to about 60% by weight, most preferably about 40 to about 60% by weight based on the total weight of said product of the hydrotalcite and the lubricant. When the content is less than 10% by weight, the effect of the stabilizer is undesirably decreased. Meanwhile, when it is more than 60% by weight, the property of preventing occurence of bubbles is also undesirably decreased.

Examples of the halogen-containing resin in which the stabilizer composition in this invention is used are a homopolymer or a copolymer of a halogen-containing monomer and a post-halogenated product of a polymer. Concrete Examples of such halogen-containing resin are a vinyl chloride polymer, a vinyl chloridevinyl acetate copolymer, a vinylidene chloride polymer or copolymer, and chlorinated olefin polymers such as a post-chlorinated vinyl chloride polymer, chlorinated polyethylene and chlorinated polypropylene.

The stabilizer composition in this invention can preferably be used in a polymer blend of the above homopolymer or copolymer of the halogen-containing monomer or the post-halogenated product of the polymer, and a halogen-free organic resin such as an ABS resin, an MBS resin, an ethylene-vinyl acetate copolymer, a butadiene resin, an urethane resin or a vinyl acetate resin.

The stabilizer composition in this invention may further contain a stabilizing aid comprising an organic acid salt of zinc and a beta-diketone. Examples of the organic acid salt of zinc include zinc stearate and zinc octylate. Examples of the beta-diketone are stearoylbenzoylmethane, dibenzoylmethane, ethyl acetoacetate, dehydroacetic acid, acetylacetone, benzoylacetone and trifluoroacetylacetone.

The stabilizer composition in this invention can contain an organotin heat stabilizer. Examples of the organotin heat stabilizer include dibutyltin mercaptide, dibutyltin laurate, dibutyltin maleate, di-n-octyltin mercaptide, di-n-octyltin maleate and di-n-octyltin laurate.

This invention further provides a resin composition which is heat-stabilized and prevents occurrence of bubbles in molded articles, said composition comprising (a) 100 parts by weight of a halogen-containing resin, and (b) about 0.1 to about 20 parts by weight, preferably about 0.1 to about 5 parts by weight of a melt mixture containing a product of a hydrotalcite obtained by removing water of crystallization and a lubricant.

A means of blending the halogen-containing resin with the melt mixture in producing the resin composition in accordance with this invention is not particularly limited; ordinary means such as a ribbon blender, a high-speed mixer, a kneader, a pelletizer and an extruder are available.

In producing the resin composition in this invention, additives commonly used in the thermoplastic resin composition can be blended besides the aforesaid melt mixture.

Examples of such additives are an antioxidant, an infrared absorber, an antistatic agent, a lubricant, a plasticizer, a coloring agent, a filler and another stabilizer.

Examples of the antioxidant include 2,6-di-t-butyl-p-cresol, 2,5-di-t-butylhydroquinone, 2,2'-methylene-bis-(4-methyl-6-t-butylphenol), 4,4'-thiobis-(6-t-butylphenol), 4,4'-thoibis-(6-t-butyl-m-cresol) and octadecyl 3-(3',5'-di-t-butyl-4'-hydroxyphenol)propionate. Examples of the infrared absorber include 2-hydroxy-4-octoxybenzophenone, 2(2'-hydroxy-5-methylphenyl)benzotriazole and ethyl-2-cyano-3,3-diphenyl acrylate. Examples of the antistatic agent include polyethylene oxide, carbowax, pentaerythritol monostearate, sorbitan monopalmitate and sulfur oleate. Examples of the lubricant include calcium stearate, zinc stearate, butyl stearate and ethylene-bis-stearamide. Examples of the plasticizer include diisodecyl adipate, butyl stearate, butyl epoxystearate, triphenyl phosphate, waxes, low-molecular-weight polystyrene, flowable paraffins, diethyleneglycol dibenzoate, dimethyl phthalate and dibutyl phthalate. Examples of the coloring agent include carbon black, phthalocyanine, quinacridone, indoline, azo pigments, titanium oxide, red oxide, chrome yellow, yellow iron oxide and mineral violet. Examples of the filler include asbestos, glass fibers, talc, mica, wollastonite, calcium silicate, aluminum silicate and calcium carbonate. Examples of another stabilizer include organotin compounds such as dibutyltin laurate, dioctyltimaleate and dibutyltin mercaptoacetate; epoxy compounds such as epoxydized soybean oils and epoxy resins; phosphorous acid esters such as tris(nonylphenyl) phosphite and hydrogenated 4,4'-isopropylidenediphenol phosphite; sulfur-containing compounds such as thiodipropionic acid and diethyl thiodipropionate; phenols such as alkyl gallate, alkylated phenol and styrenated phenol; polyhydric alcohols such as 1,3-butanediol and propylene glycol; alpha-aminoacids and their functional derivatives such as glycerol, alanine, leucine, isoleucine, glycine amide, histidine ethyl ester and tryptophanebenzyl ester; polypeptides and polyamides such as casein, gelatin, prolamin, gliadin, polycapramide and polyhexamethylene sebacamide; hydroxides and oxides of alkaline earth metals and other metals such as magnesium hydroxide, potassium hydroxide, magnesium oxide, calcium oxide and zinc oxide; and aliphatic acid metal salts such as calcium stearate, magnesium stearate, barium stearate, zinc stearate, Ca-Zn aliphatic acid salts and Ba-Zn aliphatic acid salts. The amounts of these additives can properly be selected. For example, based on the weight of the halogen-containing resin, the antioxidant is about 0.01 to about 1.0%, the ultraviolet absorber about 0.01 to about 1.0%, the antistatic agent about 0.01 to about 1.0%, the lubricant about 0.1 to about 5.0%, the plasticizer about 0.1 to about 50%, the coloring agent about 0.1 to about 5.0%, the filler about 0.1 to about 50%, and another stabilizer about 0.01 to about 5%, respectively.

This invention can not only effectively prevent corrosion and formation of rust in metal portions of a molding machine and a mold in molding halogen-containing resins and degradation of molded articles owing to heat or ultraviolet rays, but also quite effectively prevent occurrence of bubbles in molded articles at the time of industrial production, which was so far scarcely avoided when using hydrotalcite stabilizers. Moreover, because the hydrotalcites and the lubricant used in this invention do no harm from the aspect of food sanitation, the application field of the halogen-containing resins can be more enlarged than ever.

Since the halogen-containing resins containing the heat stabilizer composition in this invention solve the problems with heat stability, degradation due to ultraviolet rays, occurrence of bubbles in molded articles and harm at the same time, the molded articles obtained therefrom are suited for bottles for drinking water, bottles for edible oils, cosmetic containers and films for food package. As the heavy metal additives used so far are not needed, the molded articles can also be well used in window frames.

Especially, as the molded articles are free from bubbles and excellent in heat stability and appearance, they are suitable for bottles for drinking water in particular.

The following Examples and Comparative Examples illustrate this invention more specifically.

EXAMPLES 1-3

A powder of a hydrotalcite solid solution (containing about 11% of water of crystallization) having the following chemical composition

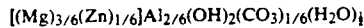
[(Mg)$_{3/6}$(Zn)$_{1/6}$]Al$_{2/6}$(OH)$_2$(CO$_3$)$_{1/6}$(H$_2$O)$_1$ was heated in an oven at 25° C. for 4 hours to remove water of crystallization. The TGA analysis of the product obtained by removing water of crystallizaiton revealed that about 2% of water of crystallization remained, and said product had the following chemical composition.

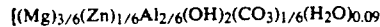
[(Mg)$_{3/6}$(Zn)$_{1/6}$Al$_{2/6}$(OH)$_2$(CO$_3$)$_{1/6}$(H$_2$O)$_{0.09}$ One kilogram of a hydrogenated castor oil (Lox10L-G15, a tradename for a product of Henkel) was charged into a 20-liter Henschel mixer and heated to about 120° C. This temperature was kept with stirring until said oil became completely molten. After it was completely molten, the powder of the hydrotalcite solid was added in the amount shown in Table 1, and they were stirred for about 30 minutes and uniformly mixed.

The thus obtained melt kneaded product was withdrawn, and simultaneously cooled and pulverized via open rolls with a clearance of about 1 mm.

The kneaded product was put in a desiccator of 30° C. and relative humidity of 75% to measure moisture absorption. The results are shown in Table 1.

Moreover, in order to actually ascertain occurrence of bubbles, the kneaded product was exposed to the ambient atmosphere for 1 hour. Subsequently, the following ingredients were mixed.

|  | Parts by weight |
|---|---|
| PVC (average molecular weight 700) | 100 |
| Epoxidized soybean oil | 1.5 |
| Acrylic processing aid | 1.5 |
| MBS | 1.0 |
| Zinc octylate | 0.1 |
| Stearoylbenzoylmethane | 0.2 |
| Hydrotalcite solid solution composition | shown in Table 1 |

They were kneaded via an extruder at 200° C., and then molded into a sheet 25 cm in width and 0.3 mm in thickness by means of a calender roll. This sheet was cut into 50×20×0.3 mm test pieces, and the number of bubbles and the surface appearance were observed with an unaided eye. The sheets were placed into an oven of 190° C. and heat stability (time that lapses until they are blackened) was measured. The results are shown in Table 1.

COMPARATIVE EXAMPLE 1

The hydrotalcite solid solution obtained by removing water of crystallization, which was produced in Example 1, was subjected to the same test as in Example 1 except that to make the amount of the hydrotalcite solid solution approximately the same as in Example 1, it was changed into 0.8 part by weight. The results are shown in Table 1 and FIG. 1.

COMPARATIVE EXAMPLE 2

Example 1 was followed except that the hydrotalcite solid solution obtained by removing water of crystallization and the hydrogenated castor oil were kneaded with the Henschel mixer at 80° C. which was lower than the melting point of the hydrogenated castor oil. Subsequently, the kneaded product was cooled and pulverized via open rolls as in Example 1. The resulting product was subjected to the same test as in Example 1. The results are shown in Table 1.

TABLE 1

Evaluation of occurrence of bubbles and heat stability of calendar-molded sheets

|  | Composition of the kneaded product | | Amount of the kneaded product (parts by weight) | Occurrence of bubbles & appearance | | Heat stability (time that lapses until the product is blackened at 190° C.) (min.) |
|---|---|---|---|---|---|---|
|  | Hydrotalcite (wt. %) | Lubricant (wt. %) |  | Number of bubbles | Surface appearance |  |
| Example 1 | 20 | 80 | 4.0 | 0 | transparent and smooth | 55 |
| Example 2 | 40 | 60 | 2.0 | 0 | transparent and smooth | 50 |
| Example 3 | 60 | 40 | 1.3 | 0 | transparent | 50 |

TABLE 1-continued

Evaluation of occurrence of bubbles and heat stability of calendar-molded sheets

| | Composition of the kneaded product | | Amount of the kneaded product (parts by weight) | Occurrence of bubbles & appearance | | Heat stability (time that lapses until the product is blackened at 190° C.) (min.) |
|---|---|---|---|---|---|---|
| | Hydrotalcite (wt. %) | Lubricant (wt. %) | | Number of bubbles | Surface appearance | |
| Comparative Example 1 | 100 | 0 | 0.8 | 195 | and smooth The surface was wavy in places and somewhat poor in transparency | 40 |
| Comparative Example 2 | 40 | 60 | 2.0 | 61 | The surface had micro irregularity | 45 |

EXAMPLE 4

A powder of a hydrotalcite solid solution having the following chemical composition

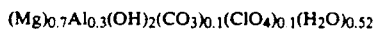
$(Mg)_{0.7}Al_{0.3}(OH)_2(CO_3)_{0.1}(ClO_4)_{0.1}(H_2O)_{0.52}$ was placed into an oven and heated at 250° C. for 4 hours to remove water of crystallization. The TGA analysis of the product obtained by removing water of crystallization revealed that the amount of water of crystallization was decreased from 11% before removing water of crystallization to 1%. Therefore, the product obtained by removing water of crystallization had the following chemical composition.

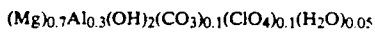
$(Mg)_{0.7}Al_{0.3}(OH)_2(CO_3)_{0.1}(ClO_4)_{0.1}(H_2O)_{0.05}$

Forty kilograms of glycerol ricinoleate was charged into a 100-liter homomixer and completely melted at about 120° to 130° C. Thereafter, 40 kg of the hydrotalcite solid solution obtained by removing water of crystallization was gradually added, and they were stirred for about 30 minutes and uniformly mixed.

The resulting melt-kneaded product was cooled and pulverized via open rolls.

The following ingredients were then mixed.

| | parts by weight |
|---|---|
| PVC (molecular weight 700) | 100 |
| Octyltin mercaptide | 1.0 |
| Wax E | 0.4 |
| Zinc octylate | 0.05 |
| Hydrotalcite solid solution composition | 2.0 |

Subsequently, the mixture was molded into a sheet 5 cm in width and 1 mm in thickness at about 200° C. by means of an extruder. This sheet was cut into a test piece of 50×20×1 mm, and the number of bubbles and the surface appearance were observed with an unaided eye. This test piece was placed into an oven of 190° C. to evaluate heat stability (time that lapses until it is blackened). The results are shown in Table 2.

COMPARATIVE EXAMPLE 3

Example 4 was repeated except that the hydrotalcite solid solution obtained by removing water of crystallization was used as such without being melt-mixed with glycerol ricinoleate. The same evaluation as in Example 4 was then conducted. The results are shown in Table 2.

TABLE 2

| | Occurrence of bubbles & appearance | | Heat stability (min.) |
|---|---|---|---|
| | Number of bubbles | Surface appearance | |
| Example 4 | 0 | transparent and smooth | 90 |
| Comparative Example 3 | 130 | The surface was irregular and poor in transparency. | 80 |

What we claim is:

1. A stabilizer composition for use in halogen-containing resins, comprising as an active ingredient a melt mixture containing a product of a hydrotalcite obtained by removing water of crystallization and a hydrogenated castor oil, the amount of said product being about 10 to about 90% by weight based on the total weight of said product of the hydrotalcite and the hydrogenated castor oil, said product being represented by formula (1)

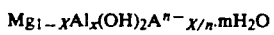
$$Mg_{1-x}Al_x(OH)_2A^{n-}{}_{x/n}\cdot mH_2O \quad (1)$$

wherein
$0 < X \leq 0.5$, preferably $0.2 \leq x \leq 0.4$,
$A^{n-}$ denotes an anion of n-valence, and
$0 \leq m \leq -0.3$ or by formula (2)

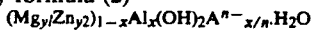
$$(Mg_{y1}Zn_{y2})_{1-x}Al_x(OH)_2A^{n-}{}_{x/n}\cdot H_2O \quad (2)$$

wherein
$A^{n-}$ denotes an anion of n-valence,
$0 < x \leq 0.5$,
$0.5 < y1 < 1$,
$0 < y2 < 0.5$, and
$0 \leq m \leq 0.3$.

2. The stabilizer composition of claim 15 wherein the amount of the product of the hydrotalcite obtained by removing water of crystallization is about 40 to about 60% by weight based on the total weight of said product of the hydrotalcite and the hydrogenated castor oil.

3. The stabilizer comosition of claim 15 further comprising an organic acid salt of zinc and a beta-diketone.

4. A heat-stabilizer resin composition comprising
   (a) 100 parts by weight of a halogen-containing resin selected from the group consisting of a vinyl halide resin and a chlorinated olefinic resin and
   (b) about 0.1 to about 20 parts by weight of a metal mixture containing a product of a hydrotalcite obtained by removing water of crystallization and a hydrogenated castor oil, the amount of said product being about 10 to about 90% by weight based on the total weight of said product of the hydrotalcite and the hydrogenated castor oil.

5. The resin composition of claim 4 wherein the content of the product of the hydrotalcite obtained by removing water of crystallization is about 40 to about 60% by weight based on the total weight of said product of the hydrotalcite and the hydrogenated castor oil.

6. The resin composition of claim 4 further comprising an organic acid salt of zinc and a beta-diketone.

7. The resin composition of claim 6 wherein per 100 parts by weight of the halogen-containing resin, the amount of the organic acid salt of zinc is about 0.01 to 1 part by weight and the amount of the beta-diketone is about 0.01 to 1 part by weight.

8. The resin composition of claim 4 further comprising an organotin compound heat stabilizer.

* * * * *